United States Patent
Schuler

(10) Patent No.: US 9,663,339 B2
(45) Date of Patent: May 30, 2017

(54) INDUSTRIAL TRUCK WITH AN INTERCHANGEABLE BATTERY BLOCK

(71) Applicant: Jungheinrich Aktiengesellschaft, Hamburg (DE)

(72) Inventor: Michael Schuler, Schoenberg (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 0 days.

(21) Appl. No.: 15/006,644

(22) Filed: Jan. 26, 2016

(65) Prior Publication Data

US 2016/0214840 A1 Jul. 28, 2016

(30) Foreign Application Priority Data

Jan. 26, 2015 (DE) .................. 10 2015 101 051

(51) Int. Cl.
 *B60K 1/04* (2006.01)
 *B66F 9/075* (2006.01)

(52) U.S. Cl.
 CPC ............ *B66F 9/07531* (2013.01); *B60K 1/04* (2013.01); *B66F 9/0754* (2013.01); *B60K 2001/0411* (2013.01); *B60K 2001/0494* (2013.01)

(58) Field of Classification Search
 CPC ...... B66F 9/07531; B66F 9/0754; B60K 1/04; B60K 2001/0411; B60K 2001/0494
 USPC ............. 384/51, 58; 193/35 C, 35 R, 35 MD
 See application file for complete search history.

(56) References Cited

U.S. PATENT DOCUMENTS

| 1,406,228 | A | * | 2/1922 | Riedel | B65G 13/11 193/35 R |
|---|---|---|---|---|---|
| 2,172,380 | A | * | 9/1939 | Harris | F27D 3/028 193/35 R |
| 2,172,381 | A | * | 9/1939 | Harris | F27D 3/028 193/35 R |
| 2,651,552 | A | * | 9/1953 | Pitner | F16C 29/04 384/51 |
| 2,693,269 | A | * | 11/1954 | Bentley | B65G 39/09 193/35 R |
| 2,739,540 | A | * | 3/1956 | Woldring | F25D 25/04 104/135 |
| 2,917,148 | A | * | 12/1959 | Rath | B65G 13/11 193/35 R |
| 2,990,929 | A | * | 7/1961 | Attwood | B65G 13/11 193/35 R |
| 3,023,487 | A | * | 3/1962 | Hinckley | B21D 53/00 29/438 |

(Continued)

FOREIGN PATENT DOCUMENTS

DE 102004047342    3/2006
DE 102007031149 A1 1/2009
DE 102008024854    11/2009

*Primary Examiner* — Hau Phan
*Assistant Examiner* — Jacob Meyer
(74) *Attorney, Agent, or Firm* — Barclay Damon, LLP

(57) ABSTRACT

An industrial truck with an interchangeable battery block and a battery compartment receiving the battery block, wherein the battery compartment has a floor with roller receivers, each of which can mount a roller module, wherein the roller receivers each have a central cut-out and two opposite-lying bearing sections for the roller module, wherein each of the bearing sections has a trough-shaped half shell, the base of which borders the central cut-out between the bearing sections.

10 Claims, 4 Drawing Sheets

(56) References Cited

U.S. PATENT DOCUMENTS

| | | | | |
|---|---|---|---|---|
| 3,509,978 | A * | 5/1970 | Bedford | B65G 1/023 193/35 R |
| 3,586,142 | A * | 6/1971 | Inwood | B65G 1/023 193/35 R |
| 3,721,326 | A * | 3/1973 | Bussienne | B65G 39/12 193/35 R |
| 4,186,830 | A * | 2/1980 | Corey | B65G 13/11 193/35 R |
| 4,202,418 | A * | 5/1980 | Waddell | E21B 10/12 175/361 |
| 4,239,100 | A * | 12/1980 | Corey | B65G 13/11 193/35 R |
| 4,681,203 | A * | 7/1987 | Kornylak | B65G 13/11 193/35 R |
| 4,832,185 | A * | 5/1989 | Huber | B65G 39/12 198/788 |
| 4,991,674 | A | 2/1991 | Fullenkamp | |
| 5,476,167 | A * | 12/1995 | Highsmith | B65G 13/11 193/35 R |
| 5,762,177 | A * | 6/1998 | Baker | B65G 39/02 193/35 R |
| 5,957,265 | A * | 9/1999 | Clopton | B65G 47/66 193/35 R |
| 6,105,746 | A * | 8/2000 | Faisant | B65G 13/11 193/35 R |
| 6,112,875 | A * | 9/2000 | Gibson | B65G 13/00 193/35 R |
| 6,464,062 | B1 * | 10/2002 | Wendt | B65G 59/04 193/35 R |
| 6,769,528 | B2 * | 8/2004 | Plesh, Sr. | B21B 43/04 193/35 R |
| 6,817,578 | B1 * | 11/2004 | Garcia | B65D 19/0002 244/118.1 |
| 6,991,082 | B2 * | 1/2006 | Olson | B64D 9/00 193/35 MD |
| 7,338,248 | B2 * | 3/2008 | Buchmann | B60S 5/06 414/522 |
| 8,167,069 | B2 * | 5/2012 | Boegelein | B60L 11/1822 180/68.5 |
| 8,356,684 | B2 * | 1/2013 | Boegelein | B60K 1/04 180/65.1 |
| 9,004,764 | B2 * | 4/2015 | Chen | F16C 33/6651 384/49 |
| 2009/0214144 | A1 * | 8/2009 | Wu | F16C 33/506 384/51 |

* cited by examiner

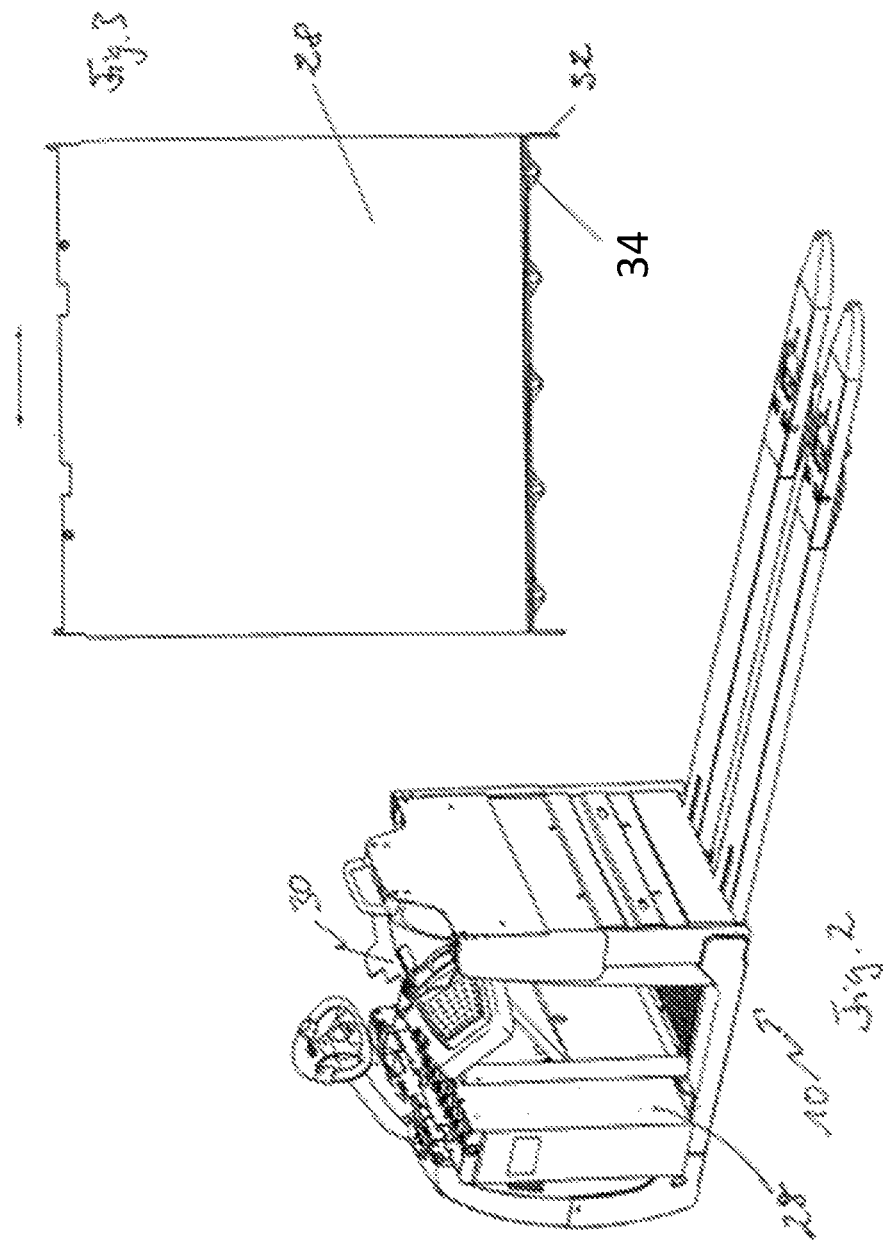

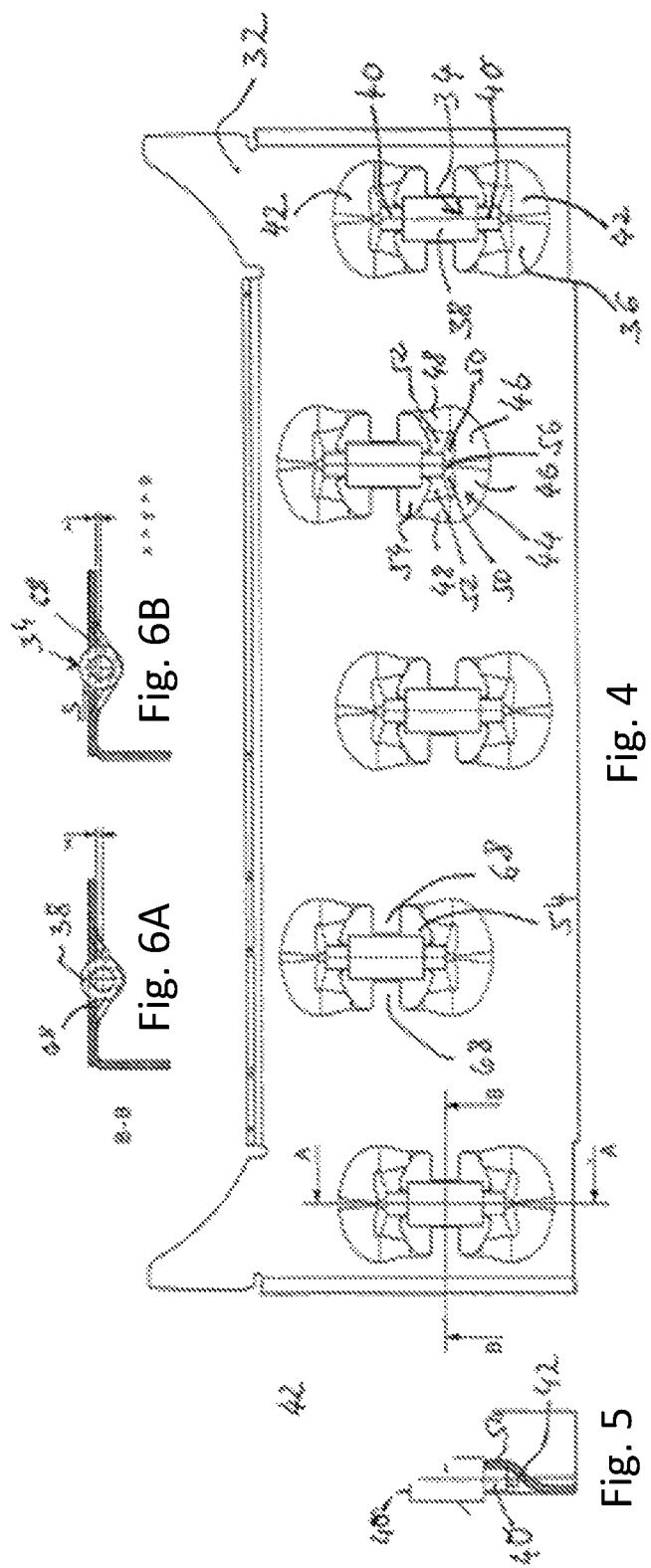

INDUSTRIAL TRUCK WITH AN INTERCHANGEABLE BATTERY BLOCK

CROSS REFERENCE TO RELATED APPLICATION

This application is based upon and claims priority to German Patent Application No. 10 2015 101 340.1, filed Jan. 26, 2015, under relevant sections of 35 USC §119, the entire contents of which are hereby incorporated by reference.

BACKGROUND OF THE INVENTION

The present invention relates to an industrial truck with an interchangeable battery block. The industrial truck has an interchangeable battery block and a battery compartment receiving the battery block, wherein the battery compartment comprises at least one lateral access opening for pushing in and pulling out the battery block. Rollers are provided on the floor of the battery compartment in the battery movement direction.

In the industrial truck according to the invention, the battery block can be a receptacle receiving one or more batteries, such as for example a battery trough. The battery block itself can also consist of the battery or batteries without them being combined in a receptacle or container.

An industrial truck with a battery compartment receiving the battery block, which has at least one guide track in the battery movement direction, on which the battery block with a support element provided therein is moveably supportable relative to the battery compartment, became known from DE 10 2008 024 854 A1. The battery compartment floor has several roller receiver openings, into which rollers to be associated with the battery compartment floor can be inserted as needed. The receiver for the rollers in the battery compartment floor has a supporting edge area protruding beyond an opening contour, with which the roller rests on the battery compartment floor.

An industrial truck with an interchangeable battery block and a battery compartment receiving the battery block is known from DE 10 2007 031 149 A1, wherein the battery compartment has a lateral access opening for pushing in and pulling out the battery block. A sliding frame that can be pushed in and back out again is provided in the battery compartment, which has a rolling device on its end arranged in the battery compartment.

The object of the invention is to provide an industrial truck, the battery compartment of which is designed in a simple and reliable manner, in order to receive roller modules for sliding a battery in and out.

The object is solved according to the invention by an industrial truck with the characteristics of claim 1. Advantageous embodiments are the subject matter of the dependent claims.

BRIEF SUMMARY OF THE INVENTION

The industrial truck according to the invention has an interchangeable battery block and a battery compartment receiving the battery block. The battery compartment is provided with roller receivers, each of which can mount a roller module. The required effort to push the battery in and back out again is reduced by the roller modules mounted in the roller receivers since the battery block can roll on the rollers. According to the invention, the roller receivers have a central cut-out and two opposite-lying bearing sections. Each of the bearing sections has a trough-shaped half shell. The base of the half shell is hereby adjacent to the cut-out between the bearing sections. The base of the trough-shaped half shell serves as a bearing section for a roller module to be inserted, which can run freely in the cut-out. In contrast to roller receivers known from prior art, it is not hereby geared towards deliberately inserted or formed supporting devices for the roller module, but rather a bearing formed in the bearing section is designed in the battery compartment floor.

In a preferred design, the bearing section is formed as one piece in the floor of the battery compartment. The arrangement or blanking of bearing sections or supporting sections in the floor is thereby foregone.

In a preferred design, a transition area is provided, which extends from the plane of the floor at an angle of inclination to the base. A continuous, flowing transition, which extends into the base of the roller receiver at an angle of inclination, is established by the transition area. A transition area progressing at an angle of inclination is also suitable for receiving great forces even in the case of low material thickness.

In a preferred design, the roller module has a roller sleeve rotatably mounted on a pin, wherein two pin ends are provided laterally. The base of the bearing section is preferably designed such that, for a roller module, both pin ends can be mounted on it. For this, the length, width and depth of the bearing section are dimensioned such that the pin ends of a roller module can rest on opposite-lying bearing sections without play occurring in the axial direction of the roller module.

In a preferred design, the base of each bearing section has a projection, which extends into the central cut-out along a connection line between the bearing sections. The projection enlarges the support surface for the pin ends of the roller module and thus feeds the force over a larger support surface into the battery compartment floor.

In a particularly preferred design, transverse stops arranged transversely to a connection line of the bearing sections are provided, which protrude into the central cut-out. The transverse stops are preferably arranged centered between the bearing sections and are preferably designed in a planar manner with respect to the floor in the battery compartment. The protruding transverse stops protrude into the cut-out between the bearing sections and form a lateral boundary for the roller module when it moves laterally in its bearing section. The laterally displaced, i.e. in the push-in or push-out direction, roller module hits the protruding transverse stops and restricts the movement of the roller module. The transverse stops form a securing device for the inserted roller module in the transverse direction.

In a preferred design, the roller module, in its state when inserted into the roller receiver, is arranged with its predominant part between the base of the roller receiver and the floor of the battery compartment. Thus, only a small section of the roller sleeve is available for rolling. When transverse stops protrude into the cut-out, then the roller sleeve is located predominantly below the transverse stops and only a small section of the roller sleeve protrudes out of the battery floor between the transverse stops.

In the inserted state of the roller module, the pin ends are located entirely between the base of the roller receiver and the floor of the battery compartment. A battery used in the vehicle according to the invention thus rolls on the mounted sleeves and not on the pins.

BRIEF DESCRIPTION OF THE DRAWINGS

The invention will be described in greater detail below using an exemplary embodiment. The figures show in:

FIG. 2 depicts the industrial truck from FIG. 1 with an open battery cover and battery partially pulled out laterally, FIG. 3 is a lateral view of the battery on the battery compartment floor, FIG. 4 is a top view of a battery compartment floor with inserted roller module, FIG. 5 is a sectional view along the line A-A from FIG. 4, FIGS. 6A, 6B are sectional views along the line B-B from FIG. 4 with and without displaced roller body.

DETAILED DESCRIPTION OF THE INVENTION

Figure 1:
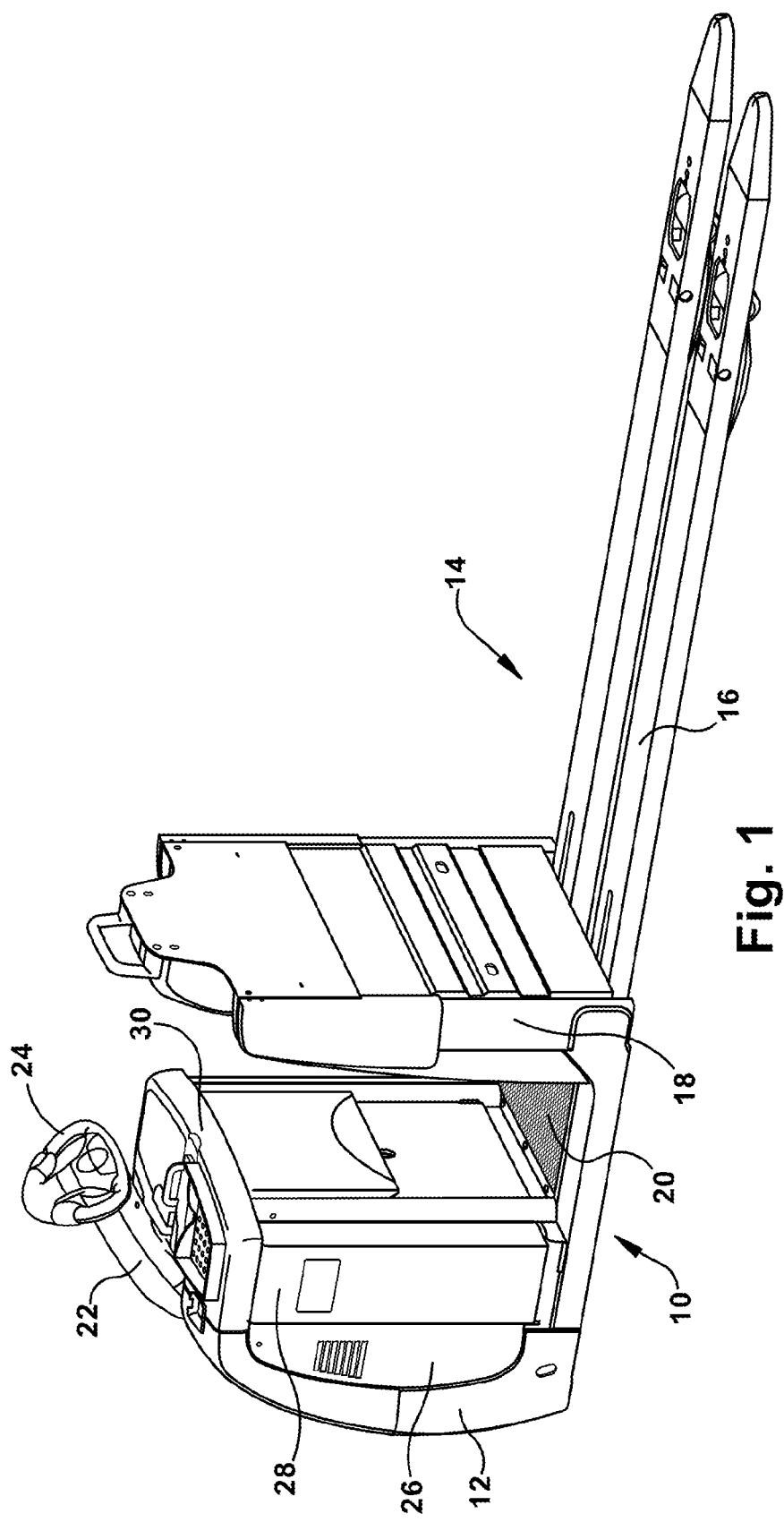
FIG. 1 depicts an industrial truck with a lateral battery compartment with a closed battery cover.

FIG. 1 shows an industrial truck 10 in a perspective view from the side. The industrial truck has a drive part 12 and a load part 14. The load part 14 has height-adjustable load forks 16, which are liftable via a lifting device (not shown) via a load frame 18. The drive part 12 has a driver's cab platform 20, on which an operator can control the vehicle via a control element 24 while standing. The control element 24 is arranged on a vehicle housing 26 via a short drawbar 22. A battery 28 is located under a battery cover 30.

FIG. 2 shows the industrial truck 10 in the same perspective as in FIG. 1, wherein the battery cover 30 here is partially open. The battery 28 has been partially pulled out of the battery compartment.

FIG. 3 shows, in a schematic view from the side, a battery 28, which stands on a battery compartment floor 32, in which roller modules 34 are mounted.

FIG. 4 shows a top view of the battery compartment floor 32. The battery compartment floor 32 has five roller receivers 36 each with an inserted roller module 34. A bearing section 44 has transitions sections 46 to 52. All transition sections 46 to 52 are arranged in the bearing sections 44 mirror-symmetrically to a longitudinal axis of the roller module.

The transition section 46 and its mirror-image counterpart lie on the part lying farthest away from the cut-out 54 of the bearing section 44. The transition sections 48 and 52 are provided adjacent to the cut-out 54, wherein the transition section 52 is arranged centrally and the transition section 48 is arranged lying outside. A further transition section 50 is arranged between the end-side transition section 48 and the inner, central transition section 52. A nose section 56, which restricts a movement of the pin end in the axial direction, is formed between the transition sections 50 and its mirror-image transition section.

As can be seen in the sectional representation from FIG. 5, the transition sections form a soft transition, which transitions into the base 58 of the bearing section. The base 58 of the bearing section mounts respectively one pin end 40. The transition sections 46 to 52, together with the base 58 of the bearing section, form a trough-shaped half shell, wherein both bearing sections together without a cut-out in between form a trough-shaped shell.

Figure 7:
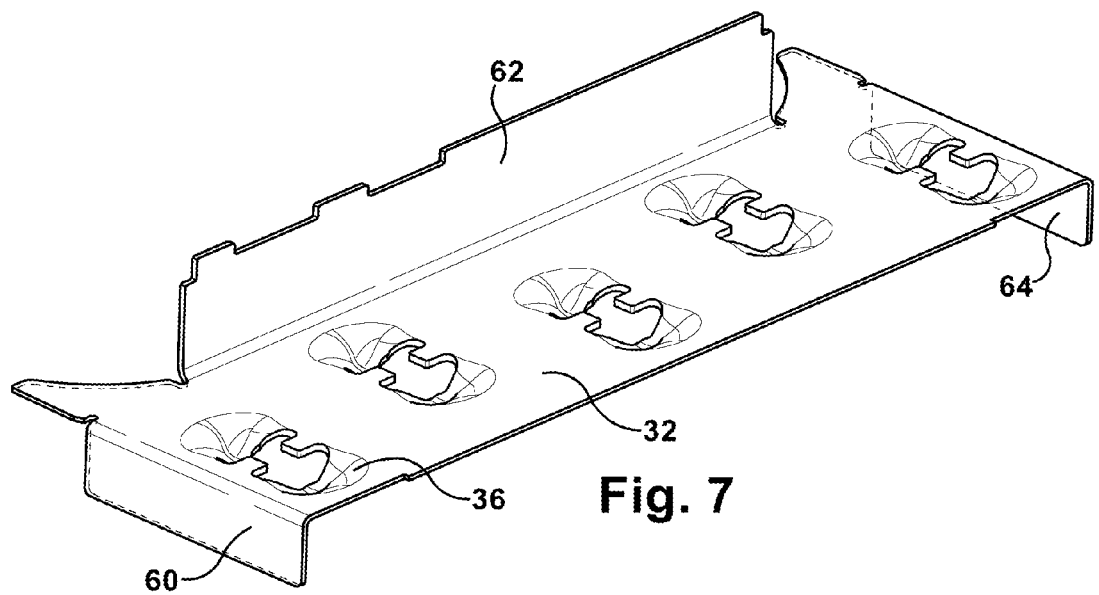
FIG. 7 is a perspective view of a battery compartment floor from the side with a view of the roller receivers and FIG. 8 is a perspective view of the battery compartment floor with its roller receivers from the bottom side.

FIG. 7 shows a battery compartment floor 32, which has a mainly rectangular shape, wherein three of the four edges are provided with bent sections 60, 62 and 64. The installation of the battery compartment floor in the battery compartment and on the vehicle frame is facilitated via the sections 60 to 64.

The roller receivers 36 are arranged behind each other in the longitudinal direction of the battery compartment floor 32, wherein, in its installed state, they extend in the transverse direction to a vehicle longitudinal direction. The roller receivers 36 are arranged offset in an alternating manner so that a pushed-in battery is supported alternately more on one and more on the other side.

Figure 8:
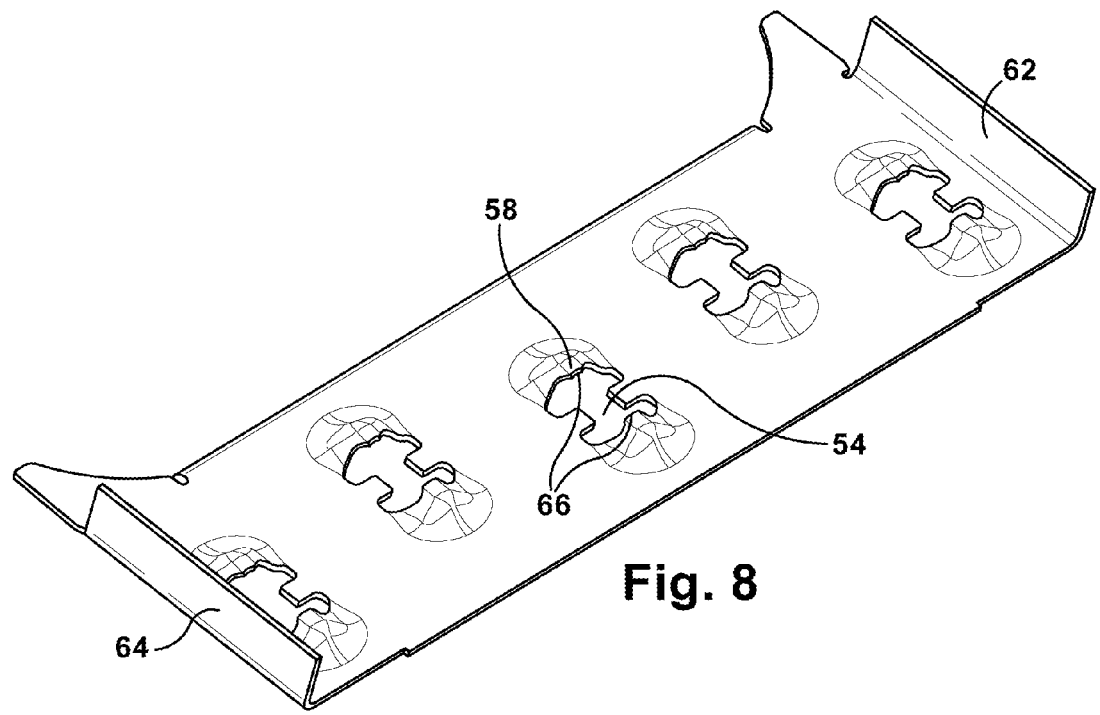

FIG. 8 shows the battery compartment floor from a different side, in which the angled section 62 is covered. Both projections 66, which protrude into the cut-out 54, can be seen in FIG. 8. The projections 66 are located at the same height as the base 58 (see FIG. 5) of the bearing section and enlarge the bearing surface.

The transverse stops 68 offer a special advantage for securing the roller receiver. As can be seen for example in FIG. 4, the transverse stops 68 protrude into the cut-out 54. The transverse stops 68 progress in a planar manner with the battery compartment floor.

The cross-section shown in FIG. 6A along the line B-B shows that the inserted roller module with its sleeve 38 is arranged mainly below the transverse stops 68. The roller sleeve 38 runs freely from the transverse stops 68. If, for example, a transverse force is exerted on the roller module while the battery is being pushed in or out, then it is displaced transversely in the bearing section. The roller module is hereby lifted along the transition section and moves up against one of the transverse stops 68. As shown in FIG. 6B, the roller module 34 displaced in the direction of the arrow S is lifted by the height x minus y in that the pin end 4 rolls in particular on the transition area 52 and thus the sleeve is pressed against the transverse stop 68. The rotary movement of the sleeve 38 stops here and a pushed-in or pushed-out battery is dragged over it.

In a preferred design, the battery compartment floor is made of a metal sheet, wherein it is possible to work with a sheet thickness of less than 8 mm, preferably less than 6 mm, in particular with 4 mm to 6 mm, due to the design of the roller receiver. Despite such a small sheet thickness, it is possible to mount in a permanent and stable manner batteries with 300 kg to 500 kg own weight via the roller modules. It should thereby be taken into consideration that impact loads can occur on an industrial truck, which are five times greater than the static load.

A roller bearing in the form of two trough-shaped half shells, which are separated from each other by a cut-out for the battery roller shell, is provided on the battery compartment floor according to the invention. The cut-out provides freedom of movement for the roller sleeve. The special geometric design of the bearing sections offers sufficient guarantee against loss of the rollers with similar stability and simple installation as well as positioning of the battery rollers. The trough-shaped half shells serve as a mount for the pin ends; the slipping of the pin ends in the vehicle and vehicle transverse direction (loss protection) is thereby mainly established. Additional transverse stops for the sleeve, which lie higher than the pivot point of the sleeve, prevent the entire roller module from being pushed out of the bearing shell. The roller receiver is manufactured through sheet metal forming, for example through pressing, stamping or deep-drawing. The degree of metal forming for the trough-shaped bearing receiver requires gentle transitions in order to prevent the material from breaking during production and to simultaneously provide sufficient stability.

The invention claimed is:

1. A battery compartment for an industrial truck for receiving an interchangeable battery block, the battery compartment comprising:
   a floor comprising roller receivers, each of which is configured to mount a roller module,
   wherein the roller receivers each comprise a central cut-out and two bearing sections for the roller module and one or more transverse stops are configured to protrude transversely into the central cut-out, and wherein each bearing section is positioned opposite each other and is formed as one piece in the floor;
   wherein each bearing sections comprises a trough-shaped half shell, wherein a base of each of the bearing sections borders the central cut-out between the bearing sections;
   wherein the roller module comprises a roller sleeve rotatably mounted on a pin and configured to contact at least one of the transverse stops in response to a transverse force, wherein contact with the at least one transverse stop prevents rotational movement of the roller sleeve, and wherein two pin ends protrude from the roller sleeve laterally and in an inserted state of the roller module, the pin ends are arranged entirely between a base of each of the roller receivers and the floor.

2. The battery compartment of claim 1, wherein each of the bearing sections comprises a transition area, which extends from a plane of the floor at an angle of inclination to the base of the bearing section, wherein the angle of inclination is less than 90° with respect to the floor.

3. The battery compartment of claim 1, wherein the base of each of the bearing sections is designed to mount a pin end.

4. The battery compartment of claim 3, wherein the base of each of the bearing sections comprises a projection, which extends into the central cut-out along a connection line between the bearing sections.

5. The battery compartment of claim 1, wherein the transverse stops protrude into the central cut-out transversely to a connection line of the bearing sections.

6. The battery compartment of claim 5, wherein the transverse stops progress in a planar manner with respect to the floor in the battery compartment.

7. The battery compartment of claim 1, wherein, in the inserted state of the roller module, the roller sleeve progresses between the base of each of the bearing sections of the roller receiver and the base of the floor.

8. A battery compartment for an industrial truck for receiving an interchangeable battery block, the battery compartment comprising:
   a floor extending along a plane and comprising a plurality of roller receivers, the roller receivers each comprising,
      a central cut-out having traverse stops, the transverse stops configured to protrude transversely into the central cut-out to a connection line of two bearing sections,
      the two bearing sections opposing each other and each having a base, wherein the two bearing sections are formed as one piece in the floor, and
      one or more transition sections arranged in the bearing sections, the one or more transition sections configured to extend from the plane of the floor at an angle of inclination to the base, wherein the angle of inclination relative to the plane of the floor is less than 90°,
   a plurality of roller modules each configured to mount within one of the plurality of roller receivers, each of the plurality of roller modules comprising,
      a pin having a first end and a second end, wherein each of the first end and the second end are configured to mount within the bearing sections, and
      a roller sleeve rotatably mounted on a portion of the pin, the roller sleeve configured to contact at least one of the transverse stops in response to a transverse force, wherein contact with the at least one transverse stop prevents rotational movement of the roller sleeve.

9. The battery compartment of claim 8, wherein the bearing sections are integral to the floor.

10. The battery compartment of claim 8, wherein alternating roller receivers are arranged in an offset manner.

* * * * *